US010176030B2

(12) United States Patent
Prasad et al.

(10) Patent No.: US 10,176,030 B2
(45) Date of Patent: Jan. 8, 2019

(54) RUNTIME MECHANISM TO CORRECT INCOMPLETE NAMESPACE IN PERSISTENT MEMORY

(71) Applicant: DELL PRODUCTS, L.P., Round Rock, TX (US)

(72) Inventors: Parmeshwr Prasad, Bangalore (IN); Binoy S. Thomas, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 58 days.

(21) Appl. No.: 15/594,774

(22) Filed: May 15, 2017

(65) Prior Publication Data

US 2018/0329790 A1 Nov. 15, 2018

(51) Int. Cl.
| | |
|---|---|
| *G06F 11/07* | (2006.01) |
| *G06F 11/20* | (2006.01) |
| *G06F 11/14* | (2006.01) |
| *G11B 20/18* | (2006.01) |
| *G06F 11/10* | (2006.01) |

(52) U.S. Cl.
CPC ........ *G06F 11/073* (2013.01); *G06F 11/0769* (2013.01); *G06F 11/1072* (2013.01); *G06F 11/1435* (2013.01); *G06F 11/2089* (2013.01); *G11B 20/1876* (2013.01)

(58) Field of Classification Search
CPC .............. G06F 11/073; G06F 11/1068; G06F 11/1072; G06F 11/108; G06F 3/0619; G06F 3/0655; G06F 3/0688; G11C 29/52
See application file for complete search history.

(56) References Cited

U.S. PATENT DOCUMENTS

| | | | |
|---|---|---|---|
| 5,873,092 A * | 2/1999 | Cheng | G06F 17/30607 |
| 8,719,768 B2 * | 5/2014 | Hass | G06F 8/10 |
| | | | 707/722 |
| 8,751,760 B2 | 6/2014 | Sauber et al. | |
| 9,612,846 B2 | 4/2017 | Puthillathe et al. | |
| 9,753,793 B2 * | 9/2017 | Kumar | G09C 1/00 |
| 9,880,754 B2 * | 1/2018 | Berke | G06F 3/0619 |
| 2012/0330640 A1 * | 12/2012 | Alpem | G06F 9/44521 |
| | | | 703/23 |
| 2015/0006834 A1 | 1/2015 | Dulloor et al. | |
| 2015/0378841 A1 | 12/2015 | Jayakumar et al. | |
| 2016/0118121 A1 | 4/2016 | Kelly et al. | |

* cited by examiner

*Primary Examiner* — Shelly A Chase
(74) *Attorney, Agent, or Firm* — Isidore PLLC

(57) ABSTRACT

An Information Handling System (IHS) includes one or more persistent memory devices coupled to a processor and system memory. During runtime, a namespace correction agent monitors the persistent modules whose full physical address space are configured as block mode and/or interleave set namespace. The namespace correction agent identifies an incomplete namespace trigger that is detected by a driver and caused by one of a faulty or missing persistent memory module. In response to identifying the incomplete namespace trigger, the namespace correction agent: access memory details identifying a corresponding faulty or missing persistent module to determine a physical label address corresponding to the incomplete namespace; corrects the physical label address corresponding to the incomplete namespace; and reenumerates the relabeled memory.

12 Claims, 4 Drawing Sheets

RUNTIME MECHANISM TO CORRECT INCOMPLETE NAMESPACE IN PERSISTENT MEMORY

BACKGROUND

1. Technical Field

The present disclosure relates in general to persistent memory modules of an information handling system (IHS), and more particularly to a method and system for updating a namespace of non-volatile dual inline memory modules (NVDIMMs) in an IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can include persistent memory such as non-volatile dual inline memory modules (NVDIMMs) that retains data even when electrical power is removed from the device due to an unexpected power loss, a system crash, or from a normal system shutdown. After the power is restored to the IHS, data can be retrieved from the NVDIMM by the IHS.

NVDIMMs are often sub-divided into namespaces, which are logic units of storage similar to Small Computer System Interface (SCSI) logical unit numbers (LUNs) or non-volatile memory (NVM) express namespaces. These are more than one possible namespace configurations on NVDIMM. Examples of common namespace configurations include: (i) a block mode configuration on one NVDIMM; and (ii) an interleave set namespace on more than one NVDIMM. A more complicated configuration involves a single NVDIMM that is configured for both part of an interleave set namespace as well as at least one block namespace. For example, a set of NVDIMMs can contribute to an interleave set namespace. When one NVDIMM fails or is hot removed, an incomplete namespace is generated. All cache lines are incomplete and the interleave set namespace becomes unusable. Input/output (I/O) cannot be performed.

The configuration with both interleave set and block mode namespaces can create a problem when any of the namespaces is bad and another good namespace is in use. The bad namespace requires correction to prevent unpredictable performance. The unpredictable behavior happens when a driver attempts to interact with an enumerated but unavailable namespace. The unpredictable behavior poses a performance risk to the IHS. A driver utilizing a particular NVDIMM may not expose the incomplete namespace when encountered.

Incomplete namespace can occur at any time. During a restart of the IHS, the Basic Input/Output System (BIOS) or equivalent can detect available persistent memory devices to create correct namespaces during initial enumeration. A generally-known mechanism exists to correct the namespace during a hot plugging of an NVDIMM. However, an uncorrectable problem arises during runtime when an incomplete namespace occurs and hot plugging is inconvenient or not an option.

BRIEF SUMMARY

In accordance with embodiments of the present disclosure, an Information Handling System (IHS) includes one or more persistent memory devices coupled to a processor. System memory is coupled to the processor and includes a namespace correction agent that is executed by the processor. During runtime of the IHS, the namespace correction agent causes the processor to monitor more than one persistent module that provides persistent storage to the IHS. Full physical address space of each persistent module is configured to contribute to a selected one of: (i) block mode namespace; (ii) interleave set namespace; and (iii) both block mode and interleave set namespace. The namespace correction agent identifies an incomplete namespace trigger that is detected by a driver and caused by one of a faulty or missing persistent memory module. In response to identifying the incomplete namespace trigger, the namespace correction agent accesses memory details identifying a corresponding faulty or missing persistent module to determine a physical label address corresponding to the incomplete namespace. The namespace correction agent corrects the physical label address that corresponds to the virtual incomplete namespace. The namespace correction agent prompts memory reenumeration. After re-enumeration, the relabeled memory becomes usable by an operating system of the IHS.

According to illustrative embodiments of the present disclosure, a method includes, during runtime of an IHS, monitoring more than one persistent module that provides persistent storage to the IHS. The full physical address space of each persistent module is configured to contribute to a selected one of: (i) block mode namespace; (ii) interleave set namespace; and (iii) both block mode and interleave set namespace. The method includes identifying an incomplete namespace trigger that is detected by a driver and caused by one of a faulty or missing persistent memory module. The method further includes, in response to identifying the incomplete namespace trigger: (i) accessing memory details identifying a corresponding faulty or missing persistent module to determine a physical label address corresponding to the incomplete namespace; (ii) replacing the physical label address corresponding to the incomplete namespace; and (iii) reenumerating the memory to an operating system.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
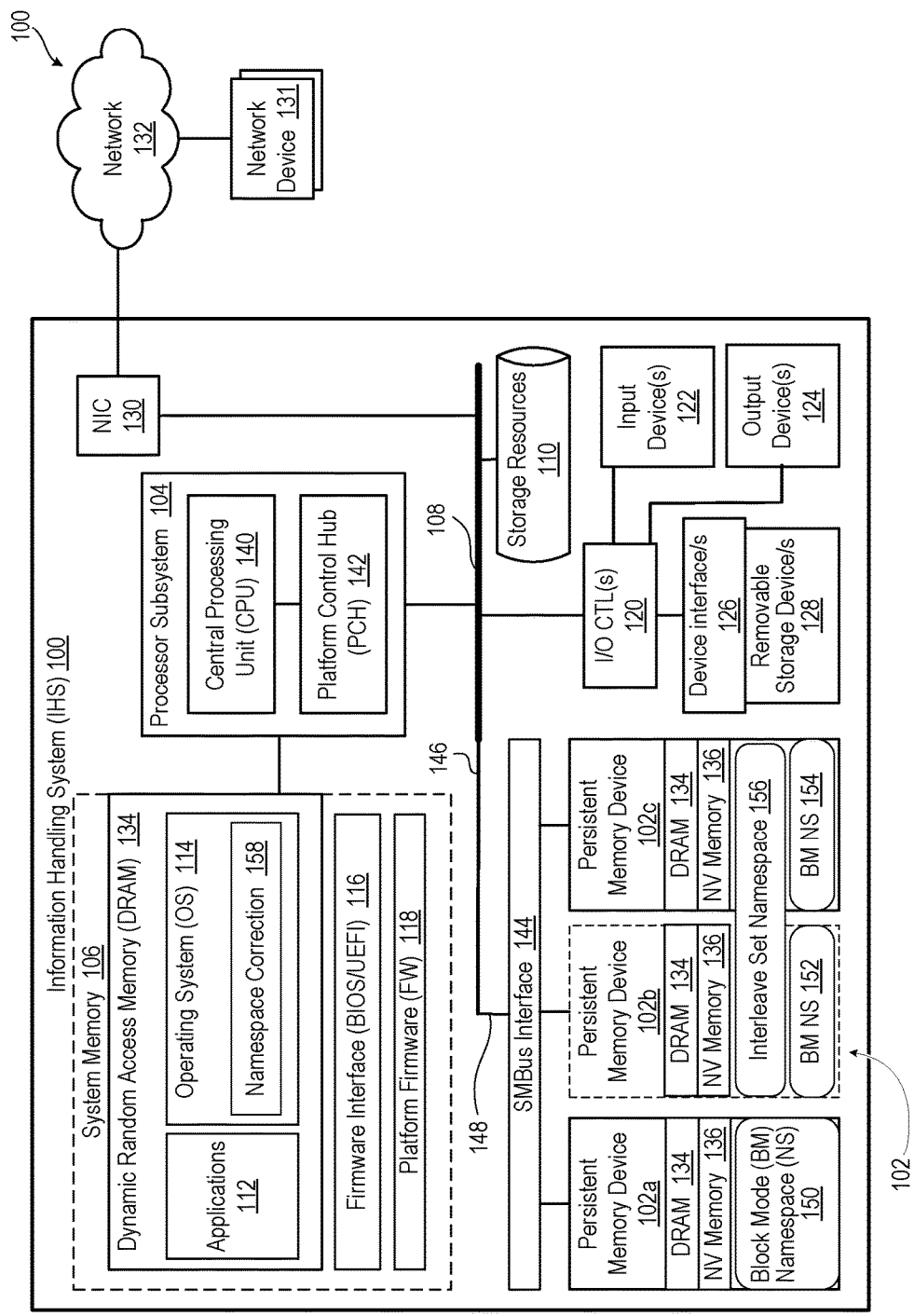
FIG. 1 illustrates a block diagram representation of an example information handling system (IHS) that supports a mechanism to correct incomplete namespace of persistent memory devices such as non-volatile dual inline memory modules (NVDIMMs), according to one or more embodiments.

In accordance with the teachings of the present disclosure, an information handling system (IHS) includes a mechanism to correct incomplete non-volatile dual inline memory module (NVDIMM) namespaces. In one or more embodiments, the IHS includes one or more persistent memory devices such as NVDIMMs coupled to a processor and system memory. During runtime, a namespace correction agent monitors the persistent modules whose full physical address space are configured as block mode and/or interleave set namespace. The namespace correction agent identifies an incomplete namespace trigger that is detected by a driver and caused by one of a faulty or missing persistent memory module. In response to identifying the incomplete namespace trigger, the namespace correction agent: access memory details identifying a corresponding faulty or missing persistent module to determine a physical label address corresponding to the incomplete namespace; corrects the label address corresponding to the incomplete namespace; and reenumerates the relabeled memory. In some instances, BIOS detects unusable memory with this detection providing information about an incomplete namespace. Incomplete namespace can occur if one of an interleave contributing NVDIMM is removed by user.

The present innovation provides: (i) a mechanism for correcting incomplete namespace using a device driver mechanism without having to manually hot plug a memory device to force re-enumeration; (ii) use of a single-ended simple two-wire bus for the purpose of lightweight communication such as system management bus (SMBus) interface to get memory information; (iii) a way to re-program the corresponding interleave namespace level area that is not dependent on a conventional device interface; and (iv) a dynamically re-enumerated namespace for use as system memory or storage.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example IHS 100 having one or more persistent memory devices 102a-102c coupled to a processing subsystem, or "processor", 104. According to one aspect, IHS 100 can automatically correct incomplete namespaces of a persistent memory device (102a-102c) during runtime without requiring a manual hot plugging of the persistent memory device (102a-102c). In addition, a faulty persistent memory device 102a-102c is exposed, enabling removal when appropriate. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring again to FIG. 1, processor subsystem 104 is coupled to system memory 106 via system interconnect 108. System interconnect 108 can be interchangeably referred to as a system bus, in one or more embodiments. System interconnect 108 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 108 can also be a Double Data Rate (DDR) memory interface. The system memory 106 can be contained within persistent memory devices such as non-volatile dual inline memory modules (NVDIMMs). For example, the NVDIMM-N variety of NVDIMMs contain both random access memory, which can serve as system memory, and non-volatile memory. It should be noted that other channels of communication can be contained within system bus 108, including but not limited to i2c or SMBus. System interconnect 108 communicatively couples various system components including, for example, replaceable local storage resources 110 such as solid state drives (SDDs) and hard disk drives (HDDs) within which can be stored one or more software and/or firmware modules and one or more sets of data that can be utilized during operations of IHS 100. Specifically, in one embodiment, system memory 106 can include therein a plurality of such modules, including one or more of application(s) 112, operating system (OS) 114, a firmware interface 116 such as basic input/output system (BIOS) or Uniform Extensible Firmware Interface (UEFI), and platform firmware (FW) 118. These software and/or firmware modules have varying functionality when their corresponding program code is executed by processor subsystem 104 or secondary processing devices within management IHS 100. For example, application(s) 112 may include a word processing application, a presentation application, and a management station application, among other applications.

IHS 100 further includes one or more input/output (I/O) controllers 120 that support connection by and processing of signals from one or more connected input device(s) 122, such as a keyboard, mouse, touch screen, or microphone. I/O controllers 120 also support connection to and forwarding of output signals to one or more connected output devices 124, such as a monitor or display device or audio speaker(s). Additionally, in one or more embodiments, one or more device interfaces 126, such as an optical reader, a universal serial bus (USB), a card reader, Personal Computer Memory Card International Association (PCMCIA) slot, and/or a high-definition multimedia interface (HDMI), can be associated with IHS 100. Device interface(s) 126 can be utilized to enable data to be read from or stored to corresponding removable storage device(s) 128, such as a compact disk (CD), digital video disk (DVD), flash drive, or flash memory card. In one or more embodiments, device interface(s) 126 can further include general purpose I/O interfaces such as inter-integrated circuit ($I^2C$), system management bus (SMB), and peripheral component interconnect (PCI) buses.

IHS 100 comprises a network interface controller (NIC) 130. NIC 130 enables IHS 100 and/or components within IHS 100 to communicate and/or interface with other devices, services, and components that are located external to IHS 100, represented as network devices 131. These devices, services, and components can interface with IHS 100 via an external network, such as example network 132, using one or more communication protocols that include transport control protocol (TCP/IP) and network block device (NBD) protocol. Network 132 can be a local area network, wide area network, personal area network, and the like, and the connection to and/or between network and IHS 100 can be wired, wireless, or a combination thereof. For purposes of discussion, network 132 is indicated as a single collective component for simplicity. However, it should be appreciated that network 132 can comprise one or more direct connections to other devices as well as a more complex set of interconnections as can exist within a local area network or a wide area network, such as the Internet.

In an exemplary embodiment, the persistent memory devices 102a-102c can be NVDIMMs, and specifically NVDIMM-N memory that combines dynamic random access memory (DRAM) 134 and negative-AND (NAND) Flash non-volatile memory (not shown) that backs up DRAM 134. DRAM 134 of the persistent memory devices 102a-102c is part of, or the entirety of, the system memory 106 supporting applications 112 and OS 114. The Flash non-volatile (NV) memory 136 of the persistent memory devices 102 provides backup and restore of all DRAM 134 of the persistent memory devices 102a-102c for reliable data persistence through power failure or shutdown. Processor subsystem 104 can include a central processing unit (CPU) 140 that is augmented by a platform control hub (PCH) 142.

A SMBus interface 144 couples the persistent memory devices 102a-102c to a system memory bus 146 that is part of the system interconnect 108. The SMBus interface 144 couples to each persistent memory device 102a-102c via SMBus 148. Persistent memory device 102a is wholly configured for block mode, having a block mode namespace 150. Persistent memory device 102b is partially configured for block mode, having a block mode namespace 152. Persistent memory device 102c is partially configured for block mode, having a block mode namespace 154. Persistent memory devices 102b-102c are partially configured for an interleave set by sharing an interleave namespace 156. In an event that persistent memory device 102b is faulty or missing, both block mode namespace 152 and interleave set namespace 156 are incomplete.

Namespaces that are in use prevent manual replacement of persistent memory device 102b. FIG. 1 illustrates a scenario wherein persistent memory device 102b is missing, creating an incomplete namespace. Specifically, block mode namespace 152 is unavailable and interleave set namespace 156 is partially unavailable. Persistent memory device 102c is affected by having a portion that is assigned to interleave set namespace 156. Persistent memory device 102c also has a block mode namespace 154 that is good. Hot plugging persistent memory device 102c is a way of reenumerating the incomplete interleave set namespace 156. However, unpredictable performance for the IHS 100 can result by hot plug removal of the previously good block mode namespace 154. Even if persistent memory device 102c did not include an actively used block mode namespace 154, a datacenter administrator can still find it inconvenient to schedule an onsite operator to hot plug the persistent memory device 102c.

According to one aspect of the disclosure, namespace correction agent 158 provided by the OS 114 can dynamically correct incomplete namespaces during runtime of the IHS 100.

Figure 2:
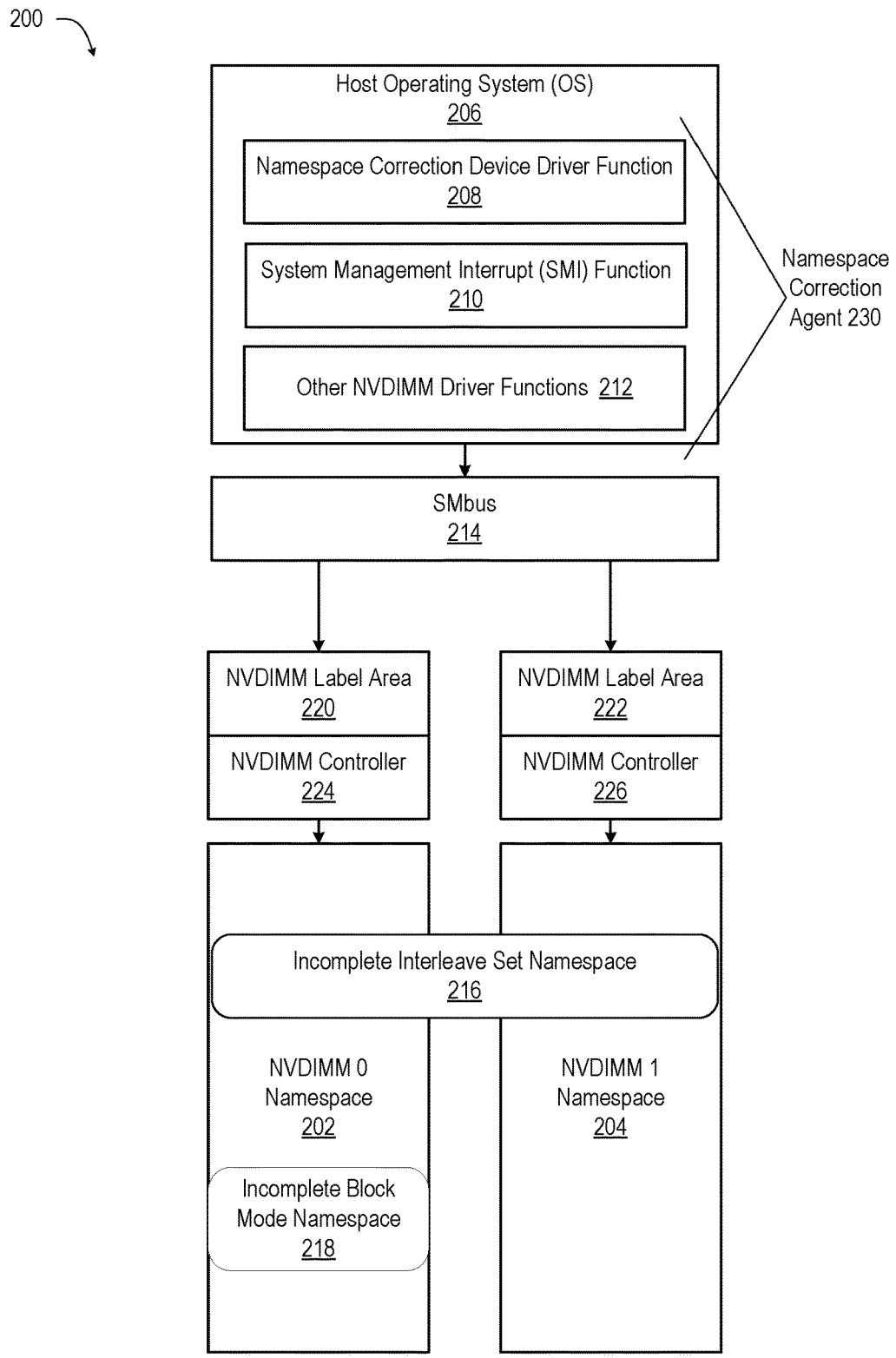
FIG. 2 illustrates a block diagram representation of a topology of IHS data fields used for updating the firmware of persistent memory devices, according to one or more embodiments.

FIG. 2 illustrates a functional topology 200 of namespace control of persistent memory devices such as NVDIMM 0 202 and NVDIMM 1 204. A host operating system (OS) 206 executes a device driver function 208 for namespace correction. A system management interrupt (SMI) function 210 obtains system memory bus information when requested by the device driver function. Other NVDIMM driver functions 212 can interact with namespaces via a SMBus 214 of NVDIMMs 202, 204 and can detect an incomplete namespace. For example, an incomplete interleave set namespace 216 can exist on both NVDIMMs 202, 204. For another example, an incomplete block mode namespace 218 can exist on one NVDIMM 202. Respective NVDIMM label areas 220, 222 configures namespaces of NVDIMM 0 202 and NVDIMM 1 204. A respective NVDIMM controller 224, 226 of each NVDIMM 0 202 and NVDIMM 1 204 manages functions such as backing up DRAM memory into NVM. The device driver function 208 with assistance from SMI function 210 operate as a namespace correction agent 230 to correct and reclaim incomplete namespaces 216, 218.

Figure 3:
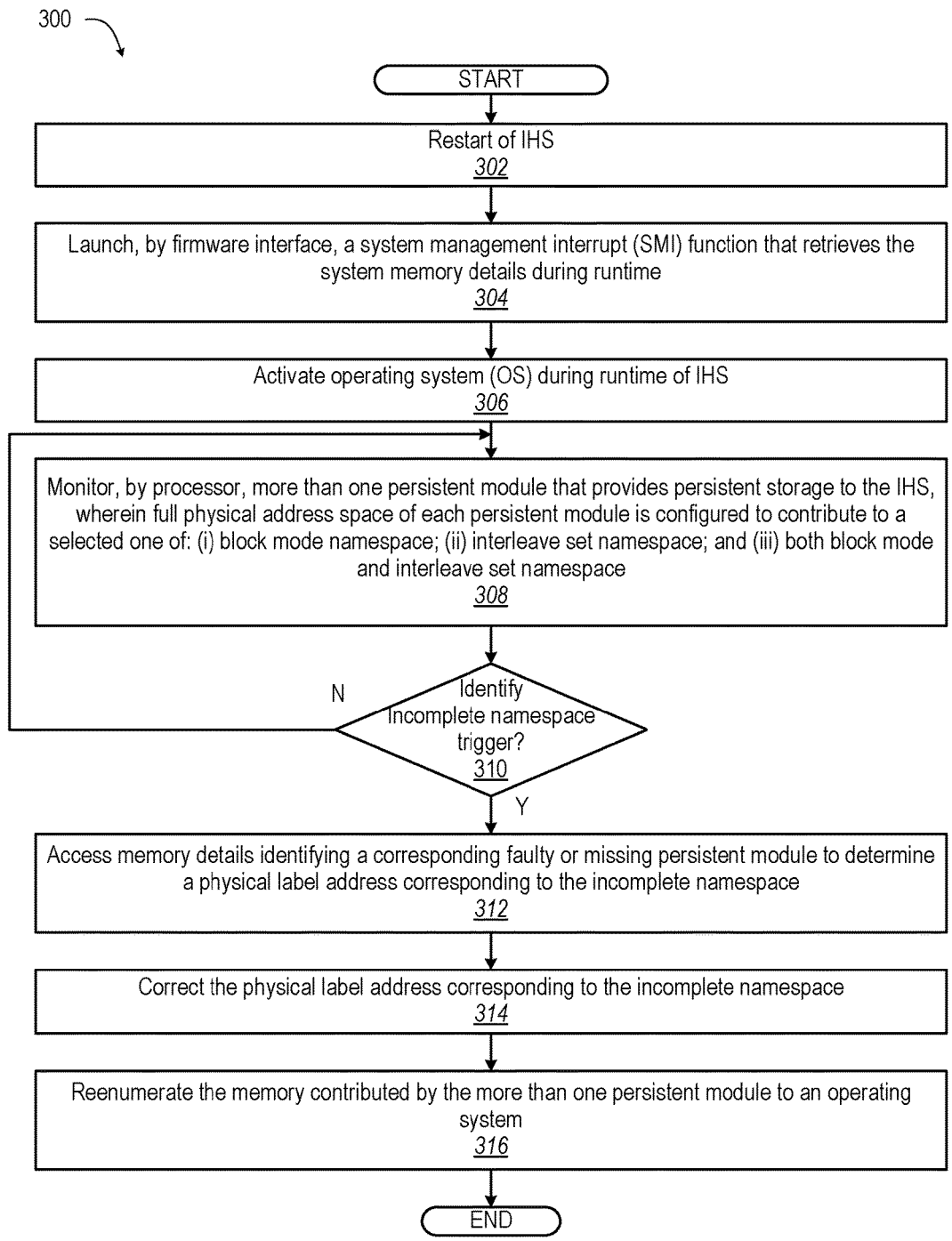
FIG. 3 illustrates a flow diagram of a first method of correcting an incomplete namespace of a persistent memory device in an IHS, according to one or more embodiments.
Figure 4:
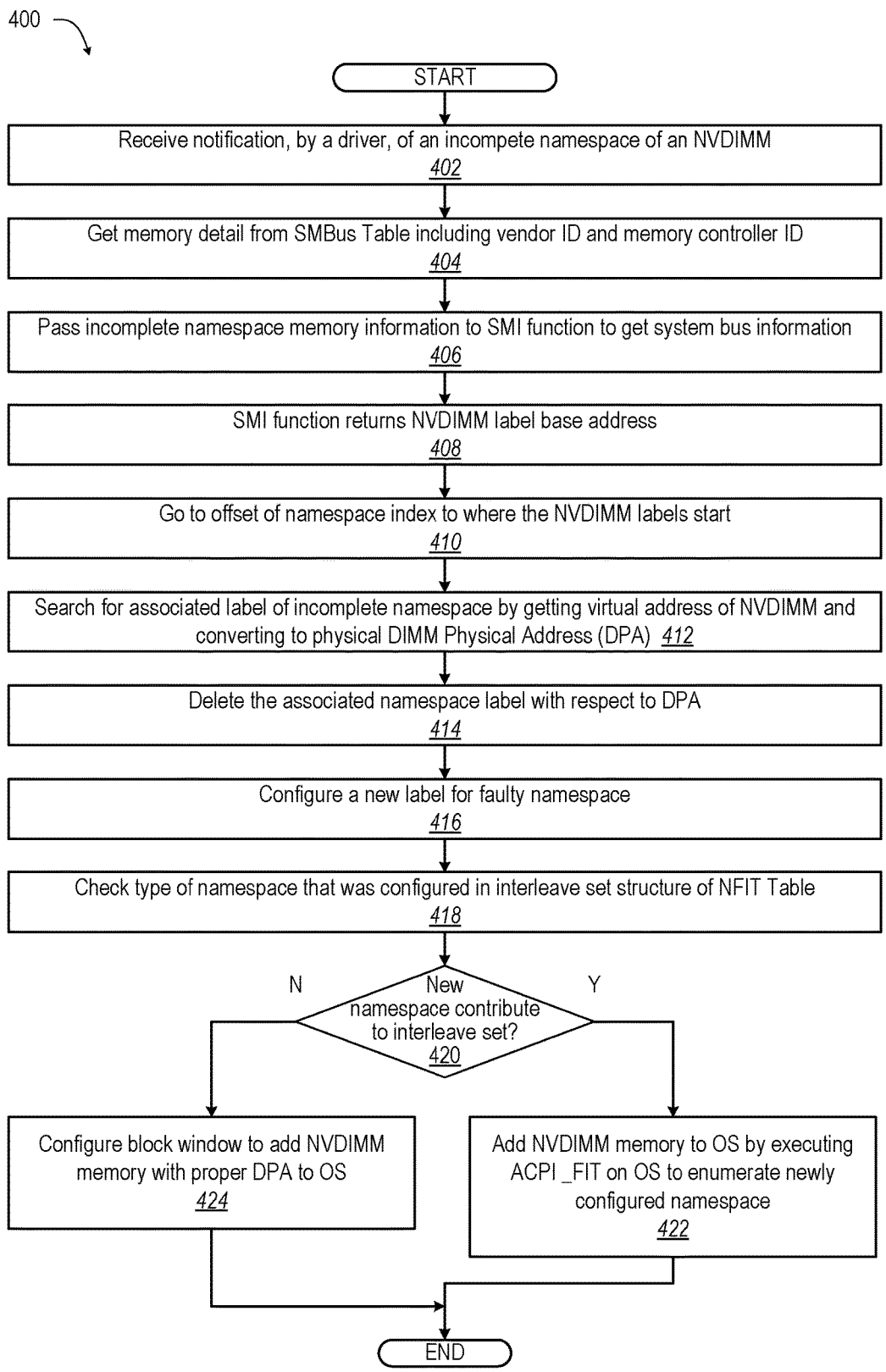
FIG. 4 illustrates a flow diagram of a second exemplary method of correcting an incomplete namespace of a persistent memory device in an IHS, according to one or more embodiments.

FIGS. 3-4 illustrate flowcharts of exemplary methods 300, 400 by which processor subsystem 103 (FIG. 1) performs different aspects of the processes that enable the one or more embodiments of the disclosure. Generally, methods 300, 400 represent computer-implemented methods. The description of methods 300, 400 is provided with general reference to the specific components illustrated within FIG. 1.

FIG. 3 illustrates an example runtime method 300 of correcting an incomplete namespace of a persistent memory device in an IHS. In one or more embodiments, method 300 begins with a restart or reboot of the IHS (block 302). A firmware interface, such as BIOS or UEFI, executed by the processor launches a system management interrupt (SMI) function that retrieves the system memory details during runtime (block 304). During restart, the SMI function is registered that can assist with namespace correction during runtime. SMI function has a sub-function that handles standalone namespaces and sub-function that handles a mix of namespaces. The SMI function gets the memory layout of the system from system management basic input/output system (SMBIOS) table. Method 300 includes activating operating system (OS) during runtime of IHS (block 306). Processor monitors, via OS drivers, more than one persistent module that provides persistent storage to the IHS. The full physical address space of each persistent module is configured to contribute to a selected one of: (i) block mode namespace; (ii) interleave set namespace; and (iii) both block mode and interleave set namespace (block 308). Method 300 includes determining (at decision block 310) whether an incomplete namespace trigger is identified. According to one embodiment, the incomplete namespace is detected by a driver and caused by one of a faulty or missing persistent memory module. In response to identifying the incomplete namespace trigger, the processor accesses memory details identifying a corresponding faulty or missing persistent module to determine a physical label address corresponding to the incomplete namespace (block 312). Method 300 includes replacing the physical label address corresponding to the incomplete namespace (block 314). The new label is chosen to be unique from previously enumerated labels to the operating system. Processor reenumerates the memory contributed by the more than one persistent module to an operating system (block 316). Then method 300 ends. Returning to decision block 310, in response to not identifying the incomplete namespace trigger, method 300 ends.

FIG. 4 illustrates an exemplary runtime method 400 of correcting an incomplete namespace in sets of NVDIMMs of an IHS. In one or more embodiments, method 400 begins by identifying a faulty NVDIMM namespace. A processor receives notice, by a driver, of an incomplete namespace of an NVDIMM (block 402). In block 404, the processor gets memory details for the NVDIMM from a system management bus (SMBus) table, including vendor identifier (ID) and memory controller ID. Method 400 includes passing the memory information regarding the incomplete namespace to a system management interrupt (SMI) function to get system bus information (block 406). Processor receives NVDIMM label base address that is returned by the SMI function (block 408). With NVDIMM label base address returned, the method includes going to the offset of the namespace index to where the NVDIMM labels start (block 410). Processor searches for associated label of incomplete namespace by getting virtual address of NVDIMM and converting to physical DIMM Physical Address (DPA) (block 412). Method 400 includes deleting the associated namespace label with respect to DPA (block 414). Processor configures a new label for the faulty namespace that is not in use to enable reenumeration of available memory resources (block 416). Processor checks the type of namespace that was previously configured in an interleave set structure of NFIT table (block 418). In decision block 420, a determination is made as to whether the new namespace contributes to an interleave set. In response to determining that the new namespace contributes to an interleave set, method 400 includes adding NVDIMM memory to OS by executing ACPI _FIT on OS to enumerate newly configured namespace (block 422). A firmware interface table (FIT) method enumerates a newly configured namespace to add persistent memory to the operating system. In a particular embodiment, the more than one persistent memory device are non-volatile dual inline memory modules (NVDIMMs). The FIT method is an Advanced Configuration and Power Interface (ACPI) _FIT (Firmware Interface Table) method that evaluates to a buffer returning data in a format of a series of NVDIMM FIT (NFIT) structures. Then method 400 ends.

The _FIT method evaluates to a buffer returning data in the format of a series of NFIT structures. This method may appear under the NVDIMM root device. The _FIT method, when present, is always evaluated by operating system power management (OSPM). _FIT returns all of the entries in the NFIT. NFIT is an ACPI table enumerated at OS boot. The NFIT Update Notification value for the NVDIMM root device notifies OSPM that OSPM needs to reevaluate the _FIT method. In the case of hot plug of NVDIMMs, the corresponding NFIT structures will not be present in NFIT. _FIT method is also used to provide these structures dynamically during hot plug.

Replacing the label address occurs in NFIT. NFIT has two kind of entries: (i) block window address of block mode namespace; and (ii) an interleave set structure of address and information about interleave set namespace. The address is searched within all available addresses until a match is found with the incomplete namespace. Replacing the label address entails identifying any label that is not in use. Label files flag any particular labels that are in use.

Returning to decision block 420, in response to determining that the new namespace does not contribute to an interleave set, then the namespace is block mode. Processor configures block window mechanism to add NVDIMM memory with an available DPA to OS (block 424). Block window mechanism is a set of programmable apertures used by driver software for non-volatile memory (NVM) block I/O. Block window mechanism is the heart of a hardware interface to NVDIMMs that supports block mode. Then method 400 ends.

In the above described flow charts of FIG. 3-4, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

The present disclosure provides for correcting incomplete namespaces first through a quick discovery and correction. When a driver finds incomplete namespaces in an interleave set, a firmware interface, such as the basic input/output system (BIOS), prevents the interleave set from appearing in the system physical address (SPA); however, the individual DIMMs still exist along with their labels for the incomplete persistent memory namespace. In the present disclosure, the mechanism exposes the incomplete namespace, even if only for manageability software. Once exposed, an administrative user sees evidence of the missing DIMMs enabling deletion of exposed incomplete namespaces. The administrative user may delete the incomplete namespace based on knowledge that the missing DIMM will never return. Once exposed, input/output (I/O) can be prevented with an incomplete namespace to avoid risk to system performance.

The present disclosure provides for correcting incomplete namespaces avoids a requirement for server shut down to perform namespace correction. In addition, the present disclosure avoids the need to remove and to reinsert into the server a persistent memory module such as an NVDIMM as a means of maintaining NVDIMM namespaces. Such a requirement can be inconvenient to accomplish in a high availability IHS. Aspects of the present innovation thus save time by not having to remove an NVDIMM to enumerate the whole NVDIMM system. Hot plugging the NVDIMM to re-enumerate the namespace may not even be an option if the NVDIMM has both a good and bad namespace and the good namespace is in use.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An Information Handling System (IHS) comprising: a processor;
   one or more persistent memory devices coupled to the processor; and system memory coupled to the processor and comprising a namespace correction agent that is executed by the processor to cause the processor to:
   during runtime of the IHS, monitor more than one persistent module that provides persistent storage to the IHS, wherein full physical address space of each persistent module is configured to contribute to a selected one of: (i) block mode namespace; (ii) interleave set namespace; and (iii) both block mode and interleave set namespace;
   identify an incomplete namespace trigger caused by one of a faulty or missing persistent memory module; and
   in response to identifying the incomplete namespace trigger;
   access memory details identifying a corresponding faulty or missing persistent module to determine a physical label address corresponding to the incomplete namespace;
   correct the physical label address corresponding to the incomplete namespace; and
   reenumerate the memory.

2. The IHS of claim 1, further comprising a firmware interface that is executed by the processor during a restart of the operating system of the IHS, the firmware interface causing the processor to launch a system management interrupt (SMI) function that retrieves the system memory details for the namespace correction agent.

3. The IHS of claim 2, wherein the namespace correction agent determines the physical label address corresponding to the incomplete namespace by:
   accessing system memory details, including a vendor identifier and a memory controller identifier, from a system management bus table identifying a corresponding faulty or missing persistent module;
   providing the system memory details to the SMI function;
   receiving a label base address for the identified persistent memory module from system bus information retrieved by the SMI function;
   locating a label associated with the incomplete namespace trigger that is offset from the label base address; and
   replacing the label associated with the incomplete namespace trigger with a new label that is not previously enumerated to the operating system.

4. The IHS of claim 1, wherein the namespace correction agent causes the processor to:
   determine that a type of the incomplete namespace is an interleave set namespace; and
   in response to the type of namespace being the interleave set namespace, issue a firmware interface table (FIT) method that enumerates newly configured namespace to add persistent memory to the operating system.

5. The IHS of claim 4, wherein:
   the more than one persistent memory device comprise non-volatile dual inline memory modules (NVDIMMs); and
   the FIT method comprises an Advanced Configuration and Power Interface (ACPI) _FIT method that evaluates to a buffer returning data in a format of a series of NVDIMM FIT (NFIT) structures.

6. The IHS of claim 1, wherein the namespace correction agent causes the processor to:
   determine that a type of the incomplete namespace is a block mode namespace; and
   in response to the type of namespace being the block mode namespace, configure block window mechanism with an available physical address to re-enumerate memory.

7. A method comprising:
   during runtime of an information handling system (IHS), monitoring more than one persistent module that provides persistent storage to the IHS, wherein full physical address space of each persistent module is configured to contribute to a selected one of: (i) block mode namespace; (ii) interleave set namespace; and (iii) both block mode and interleave set namespace;
   identifying an incomplete namespace trigger caused by one of a faulty or missing persistent memory module; and
   in response to identifying the incomplete namespace trigger:
      accessing memory details identifying a corresponding faulty or missing persistent module to determine a physical label address corresponding to the incomplete namespace;
      replacing the physical label address corresponding to the incomplete namespace; and
      reenumerating the memory.

8. The method of claim 7, further comprising, during a restart of the operating system of the IHS, launching a system management interrupt (SMI) function that retrieves the system memory details during runtime.

9. The method of claim 8, wherein determining the physical label address corresponding to the incomplete namespace comprises:
   accessing system memory details from a system management bus table identifying a corresponding faulty or missing persistent module including a vendor identifier and a memory controller identifier;
   providing the system memory details to the SMI function;
   receiving a label base address for the identified persistent memory module from system bus information retrieved by the SMI function;
   locating a label associated with the incomplete namespace trigger that is offset from the label base address; and
   replacing the label associated with the incomplete namespace trigger with a new label.

10. The method of claim 7, further comprising:
    determining that a type of the incomplete namespace is an interleave set namespace; and
    in response to the type of namespace being the interleave set namespace, issuing a firmware interface table (FIT) method that enumerates newly configured namespace to add persistent memory to the operating system.

11. The method of claim 10, wherein:
    the more than one persistent memory device comprise non-volatile dual inline memory modules (NVDIMMs); and
    the FIT method comprises an Advanced Configuration and Power Interface (ACPI) _FIT method that evaluates to a buffer returning data in a format of a series of NVDIMM FIT (NFIT) structures.

12. The method of claim 7, further comprising:
    determining that a type of the incomplete namespace is a block mode namespace; and
    in response to the type of namespace being the block mode namespace, configuring block window mechanism with an available physical address to re-enumerate memory.

* * * * *